United States Patent [19]

Smith

[11] 4,060,354
[45] Nov. 29, 1977

[54] APPARATUS FOR PRE-EXPANDING AND MOLDING EXPANDABLE THERMOPLASTIC POLYMER PARTICLES

[75] Inventor: Stuart B. Smith, Chelmsford, Mass.

[73] Assignee: Foster Grant Co., Inc., Leominster, Mass.

[21] Appl. No.: 598,508

[22] Filed: July 22, 1975

Related U.S. Application Data

[63] Continuation-in-part of Ser. No. 288,230, Sept. 11, 1972, abandoned.

[51] Int. Cl.$^2$ .............................................. B29D 27/00
[52] U.S. Cl. .............................. 425/4 R; 264/DIG. 9; 366/149; 425/209; 425/817 R; 425/DIG. 38; 425/DIG. 39
[58] Field of Search ..................... 259/9, 10, 109, 110, 259/25, 26, 45, 46, 68, 69; 264/51, 53, 45, DIG. 9, DIG. 83; 425/4 R, 817 R, 4 C, 817 C, 324, DIG. 38, DIG. 39, 200, 209; 34/10, 33

[56] References Cited

U.S. PATENT DOCUMENTS

| | | | |
|---|---|---|---|
| 3,056,753 | 10/1962 | Fronko | 264/DIG. 9 |
| 3,165,303 | 1/1965 | Paulson | 264/DIG. 9 |
| 3,170,010 | 2/1965 | Schultz et al. | 425/817 X |
| 3,207,820 | 9/1965 | Scarvelis et al. | 264/DIG. 9 |
| 3,446,882 | 5/1969 | Landon | 264/45 |
| 3,751,010 | 8/1973 | Latinen | 259/9 |
| 3,751,218 | 8/1973 | Cherenson | 425/4 R X |
| 3,843,285 | 10/1974 | Nitta et al. | 425/817 R X |
| 3,912,430 | 10/1975 | Noel | 425/4 R |

Primary Examiner—Francis S. Husar
Assistant Examiner—Mark Rosenbaum
Attorney, Agent, or Firm—Leonard S. Selman

[57] ABSTRACT

An energy saving and material conserving apparatus is provided for expanding and molding expandable thermoplastic polymer particles. Especially significant is the ability to produce molded objects of generally uniform density in the higher density range in the order of 4 - 15 pounds per square inch, or greater, as well as lower density molded objects due to improved control of the particle expansion.

The particles are partially expanded in a vessel in a heated substantially dry atmosphere and agitated in a manner to provide uniform heating thereof. After an initial heating period to soften and partially expand the particles they are subjected to superatmospheric pressure to substantially prevent further expansion and are discharged and conveyed to a mold for further expansion therein. In certain instances, the particles are subjected to superatmospheric pressure within the vessel during a portion of the initial heating period to prevent premature particle expansion and loss of blowing agent within the particles. The temperature of the particles are continuously maintained above the boiling point of the blowing agent within said particles at all times subsequent to the partial expansion of the particles up to the final expansion and fusion of the particles in a mold.

2 Claims, 2 Drawing Figures

0
APPARATUS FOR PRE-EXPANDING AND MOLDING EXPANDABLE THERMOPLASTIC POLYMER PARTICLES

This application is a continuation-in-part of U.S. Application Ser. No. 288,230 filed Sept. 11, 1972, now abandoned.

BACKGROUND OF THE INVENTION

This invention relates to the production of articles of expanded thermoplastic polymer material. Such articles are manufactured from the thermoplastic material which is provided in particulate form generally referred to as beads. The beads are made expandable during their manufacture by incorporating a so called blowing agent within. Because of their generally good flowing properties such expandable polymer beads can be easily charged into a closed mold and accordingly lend themselves readily to the manufacture of these articles by expansion and fusion in closed molds. Upon the application of heat the beads undergo a very great expansion; for example, they expand to about 30 to 40 times their original size. If expandable polymer beads were charged directly to the mold for in situ expansion they would occupy very little space and would be accumulated on the bottom of the mold. Consequently when heat is applied to the mold, the beads, not being agitated, would not expand uniformly, the hotter particles expanding before the cooler particles. This would result in the premature fusion of the earlier softened and expanded beads. The molded article would be poorly fused and contain large voids and particles of widely varying densities. For these reasons it is usually preferred to partially expand or "pre-expand" the particles in an apparatus known as a pre-expander to approximately the desired density of the finished article, fill the mold with the pre-expanded beads and further expand and fuse the pre-expanded beads together to form the finished article by applying heat to the particles in the mold.

The pre-expansion is generally accomplished by heating the beads, which contain a blowing agent comprised of a gas or a composition which upon being heated to its boiling point produces a gas, to a temperature at which the bead walls are softened. The softened bead walls expand in response to the pressure exerted by the gaseous expanding agent contained within them. The process may be carried out by either the batch or continuous methods. A typical process for the manufacture of pre-expanded polymeric particles is disclosed in U.S. Pat. No. 3,023,175, issued on Feb. 27, 1962 to Rodman Jr.

While many of the foamed plastic products commonly in use such as ice chests, floats, etc. are made of low density plastic foam there has especially in recent years developed a need for high density expandable or foam plastic items such as shoe platforms. Thus the inventive method and apparatus disclosed herein is particularly capable of uniformly pre-expanding the commonly available expandable polymer beads to produce high density (on the order of 8-15 pounds per square inch or greater) pre-expanded beads. The pre-expanded beads produced are particularly notable for their uniform density of whatever the desired value and they are dry and flowable and ready to be immediately charged into the mold for molding of the manufactured article.

This is a great advantage over pre-expanders such as disclosed in the aforementioned U.S. Pat. No. 3,023,175 patent which uses steam to heat the beads to pre-expand them in preparation for molding. Such a method not only results in wet beads that must be dried to make them flowable but as described therein this method of pre-expansion results in the requirement for aging the beads for long periods of time in storage bins, or the like, for as long as 24 hours prior to their use in molding or irregular foaming will occur in the mold.

The apparatus of the present invention eliminates entirely this long aging period and allows one to mold with the pre-expanded beads immediately upon their leaving the pre-expander. Thus the substantial storage facilities and materials handling and conveying apparatus required for aging the beads can all be eliminated with the resultant savings benefit.

As a result of the elimination of steam as the heating medium the pre-expanded beads leave the pre-expander of the present invention substantially dry and in a flowable state so that it will not stick or jam and can be used to fill molds of any desired shape. Further since they may be immediately molded they will retain their heat from their exposure in the pre-expander and it is found that relatively little heat in addition is required to be added in the mold to cause the beads to further expand therein and fuse together. Since the heating cycle can be thus shortened in the mold the cooling cycle is likewise shortened and thus an overall molding cycle time saving of up to about 60 percent may be attained, as an example. The residence time of the beads in the pre-expander is likewise very short and thus substantial time and energy savings are made possible by the present invention.

SUMMARY OF THE INVENTION

To carry out the invention there is provided a vessel which is jacketed with a heating coil so that the inside thereof is heated by means of conduction and radiation through the walls of the vessel. A predetermined amount of polymer bead containing a blowing agent is fed into the vessel which also contains an agitator. The agitator is especially designed to repeatedly wipe the beads against the heated walls of the vessel and then return them toward the central portion thereof. Due to the heated condition of the beads the blowing agent within, as it reaches its boiling point at vaporization temperature, will vaporize and apply pressure against the heat softened bead walls to expand the beads in this so called pre-expansion step. After a predetermined period of heating, the inside of the vessel is subjected to a superatmospheric pressure with a gaseous medium to substantially prevent further expansion of the beads. Thus due to the substantially uniform heating of all the particles within the pre-expander it is found that at the time of applying the superatmospheric pressure all such particles will have expanded to substantially the same extent and uniform density beads are obtained for molding the final articles. The density of the beads are determined by the temperature they are exposed to within the vessel and the time period of exposure before the superatmospheric pressure is applied thereto. The ability to control the pre-expansions of the beads to enabling one to produce uniformly high density beads is an important feature of this invention as former pre-expanders have been mainly directed toward producing lower density pre-expanded beads. For example, the pre-expander disclosed in U.S. Pat. No. 3,577,360 to Richard H. Immel is directed toward producing pre-expanded beads of ultra-low density in the order of 0.4 - 0.75 pounds per cubic foot and exposes the beads to a vacuum during pre-expansion to allow less restrained expansion of the beads. To make high density pre-expanded beads it is necessary to control the expansion to a great degree which is accomplished by the uniformity of the heating of the bead and the timely application of superatmospheric pressure to the beads as disclosed herein. By control of temperature and length of the heating period it is also possible to produce lower density pre-expanded beads, i.e., 1.25 - 3 lbs per cubic foot (p.c.f.) in accordance with the invention and the uniformity of the density of the beads can also be maintained. Uniform density can mean savings to the producer since a higher density molded product or portion of a product than desired will result in the use of more of the expensive polymer required to make any article. Uniform density also results in the better appearance of the finally molded product as the visible cell size of the fused beads appears more attractive. Further weakened portions of the article due to a lower density area are avoided.

When the beads leave the vessel they are dry and flowable and still hot from being heated within the vessel. They may be fed directly into a mold for molding of the final article or into an insulated storage bin where several of the batches of the beads from the vessel are kept until transfer into the mold. Once in the mold further heat is applied to the beads raising their temperature higher than in the pre-expansion thereof. The vaporized expanding agent and any gas, such as air, that may have permeated the bead wall will then further expand in volume under the higher temperature applying additional pressure against the softened bead wall to further enlarge the beads forcing them against one another within the mold. The heat softened polymeric bead walls will fuse together under these conditions filling up any space initially between the beads into the mold when initially charged and upon cooling a one-piece cellular coherent article will be formed that may be removed from the mold which is then ready to be filled once more to repeat the molding cycle.

A critical feature of the invention is that the temperature of the expandable polymer beads are continuously maintained above the boiling point or vaporization temperature of the expanding agent at all times subsequent to the pre-expansion of the beads up to the final expansion and fusion of the beads in the mold. By maintaining the expanding agent in its gaseous state there can be no condensation, for example, of the expanding agent to a liquid resulting in a vacuum inside the bead which may cause it to collapse due to atmospheric pressure thereon distorting any article molded from such beads. While the vacuum may be eventually dissipated by allowing air, for example, to permeate the beads in a long aging period as previously described, it is the purpose of this invention to avoid such vacuum by maintaining the expanding agent in its gaseous state at all time subsequent to the pre-expansion of the particles up to the final expansion of the particles within the mold.

DESCRIPTION OF THE INVENTION

The term "thermoplastic polymer particles" is used generically in the present discussion and in the claims and as such includes all moldable thermoplastic polymer particles regardless of how they are made. Thus, the term includes polymer particles made by aqueous suspension type polymerization, commonly known as beads or pearls comminuted particles such as those obtained by crushing and grinding slabs of mass polymerized thermoplastic material; and pellets obtained by extruding thermoplastic polymeric materials and cutting the extrudate into small particles generally referred to as pellets.

The class of polymers found useful in the present invention are the moldable thermoplastic polymers, particularly the vinyl polymers. Included in this group are the vinyl aromatic polymerizable compounds such as polystyrene and polymers of derivatives of styrene; halogen containing vinyl polymers, including polyvinylchloride and polyvinylidene chloride; and acrylic polymers, such as polyethylacrylate and polymethylmethacrylate. Copolymers of the above with each other or with other thermoplastic polymers can also be treated in the process of the invention. The preferred group of polymers for use in the invention are the alkenyl aromatic polymers, particularly polystyrene.

Expanding or blowing agents suitable for use in the present invention are those substances which are gaseous at atmospheric conditions or materials which are liquid or solids at atmospheric conditions but which will, upon being heated to a given temperature, produce a gaseous substance. The blowing agents are preferably substantially inert to the polymer. Thus, the blowing agent may be a gas, such as propane or butane, a low boiling inert liquid compound such as pentane, hexane, trichlorofluoromethane, etc., or a dry chemical compound such as a sodium bicarbonate. Combinations of the above blowing agents can also be used in the invention. In general the blowing agent is present in an amount of about 2 to 15 percent and preferably about 3 to 10 percent based on the total weight of the composition.

Figure 1:
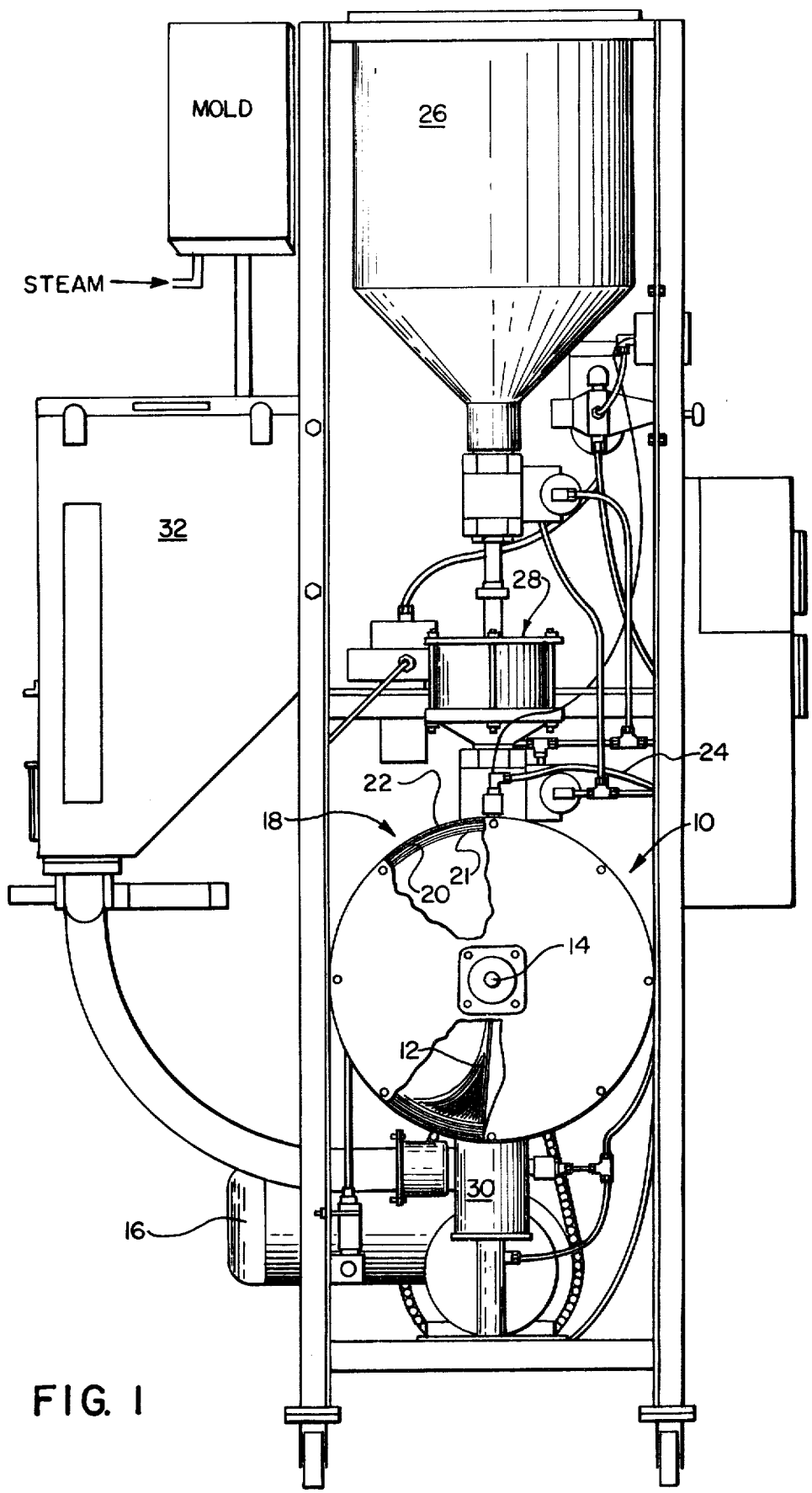
FIG. 1 is a partially schematic and partially sectioned side view of the novel apparatus for carrying out the present invention.
Figure 2:
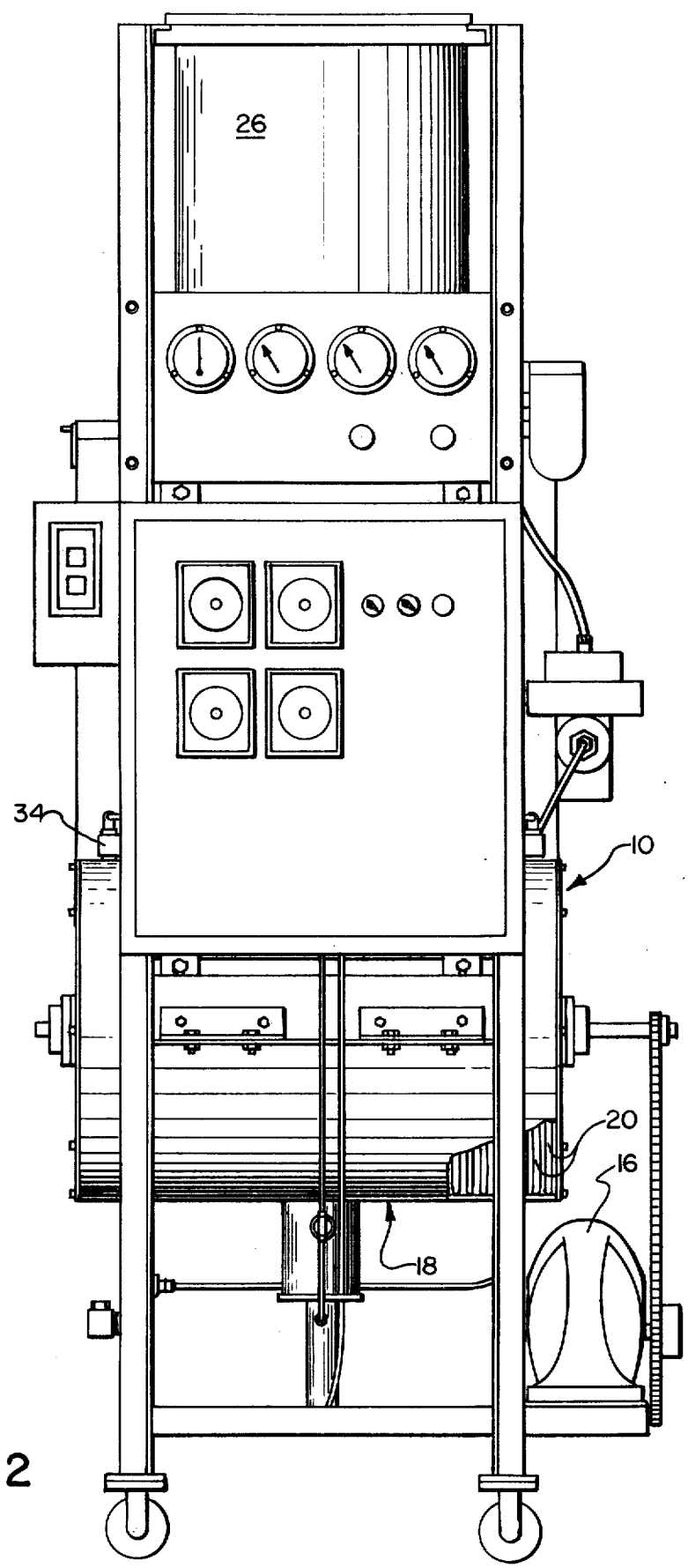
FIG. 2 is a partially schematic and partially sectioned front view of the present invention.

In carrying out the invention a predetermined amount of expandable thermoplastic polymer particles, hereinafter referred to as beads in accordance with common usage, containing an expanding agent are inserted into a closed vessel 10 as shown in FIGS. 1 and 2. The vessel 10 is preferably cylindrical in shape and includes an agitator 12 which is mounted on a shaft 14 extending along the axis of the cylindrical vessel 10. The agitator is continuously driven by a motor 16 and provides a circulation of the beads in the vessel whereby they are repeatedly wiped against the heated side walls 18 of the vessel and then returned to toward the center thereof whereupon they are again urged again out toward the vessel walls to repeat the wiping action and so on.

The beads are heated while inside the vessel 10 by means of their contact with the heat conducting walls of the vessel and from the heat radiating therefrom. The amount of unexpanded beads fed to the vessel should be determined so that the charge when expanded to the desired density gives a volume not more than about 80-85% of the inside vessel volume. The source of heat for the side walls consists preferably of a heating jacket comprising a coil of metal tubing 20 encircling the vessel side walls through which steam under pressure is forced through. The steam conducting coil may be surrounded by an enclosing outer wall 22 to prevent heat loss. Alternatively electrically heated resilient coils could be used to heat the vessel walls or steam may be injected between an inner vessel wall 21 and the outer surrounding wall 22 to form a so called steam jacket. The vessel walls are made of any good heat conducting metal such as aluminum. Provision is made for sealing the vessel to produce a closed vessel which can accomodate the build-up of superatmospheric pressure within. The superatmospheric pressure is provided for by means of a compressed gas (preferably air) source which is connected by conveying line means 24 to the vessel. A valve in the line may be manually and/or electrically operated to open and force the pressurized gas to flow into the vessel raising the gaseous pressure within acting on the beads.

The vessel has inlet means for inserting a predetermined amount of particles within said vessel from a hopper 26 and outlet means including a port or opening through which the particles may exit after the pre-expansion of the beads is completed. Any of the variously well known volumetric feeding devices such as shown at 28 may be utilized for charging the predetermined amount of expandable beads into the vessel. The outlet means may comprise a known simple valve mechanism 30 which may be opened either mechanically or electrically as desired. The feeding device is preferably also mechanically or electrically operated so that under high speed manufacturing conditions electric timing devices may control the opening and closing of the inlet feeding and outlet means to precisely control the residence time of the beads in the vessel. In practice the inside of the vessel is pressurized to control the bead expansion a normally short time (i.e., 10 seconds) before the outlet means to the vessel is opened so that the pressurized gas within while being relieved through the outlet means will carry the pre-expanded beads out of the vessel.

The heating means described also is preferably provided with temperature controls to provide a means of controlling the amount of heat to which the beads are exposed to within the vessel.

As the pre-expanded polymer beads leave the vessel they may be fed directly into molding means through conventional conveying means or may be stored in an insulated storage hopper 32 to await molding in a manner so that they are maintained in their heated condition to the extent that the bead temperature is above the vaporization temperature of the blowing agent contained within the beads.

The atmosphere inside vessel 1 surrounding the beads should be a substantially dry gas, preferably air at substantially atmospheric presure or slightly above due to the effect of heat thereon. The vessel may be an entirely closed vessel, except of course for its inlet and outlet ports when in operation or the vessel may be slightly vented but not enough to preclude its pressurization to the necessary degree when desired.

The temperature to which the expandable polymer beads are exposed to in the vessel will depend upon the type of polymer being processed. As an example, for polystyrene expandable beads, heating generally to a temperature of about 175°–180° F will soften the polymer and temperature of up to about 210°–220° F can be used provided sufficient agitation is provided. The agitation described above to provide the uniform heating of the beads by the vessel walls further acts to prevent the beads from sticking to each other or agglomerating when the beads are in a heated softened state within the vessel. For molding of the polystyrene beads the beads are heated to a slightly higher temperature of about 225° F.

The amount of time the beads remains within the vessel will depend upon a number of variables including the type of polymer they are made of (i.e., the softening temperature range thereof) the amount of blowing agent incorporated within the beads, the temperature within the vessel to which the beads are exposed, the mode of agitation thereof and the desired density of the pre-expanded bead to be produced for molding purposes.

The amount of superatmospheric pressure to which the beads are exposed within the vessel to control the density and uniformity of the beads will likewise depend upon the variable mentioned above and will best be determined by gaining experience with the particular polymeric material being used. Pressures inside the vessel on the order of about 40–50 inches of mercury have been found to be usable.

As an additional feature of the present invention and especially in the production of lower density pre-expanded beads (1.25 – 3 pcf) the vessel is pressurized using compressed air for a period immediately after the beads are inserted, the beads being maintained under superatmospheric pressure during the initial stages of the heating period. It is believed that the increased pressure on the beads will prevent loss of expanding agent by permeation from the beads during the initial heating stage. The increased pressure is then relieved by venting the vessel after a predetermined time period during which the beads are softened and the beads are then allowed to expand under atmospheric pressure. If the vessel is a closed one a special selectively operable vent means 34 is provided to relieve the initially imposed superatmospheric pressure. The retained expanding agent within the beads will then provide further internal pressure from within the bead to expand them to a lower density than would be achieved otherwise. After the beads are expanded the desired amount the vessel 10 is again pressurized as described above to achieve the desired uniform density before the beads are discharged. The maintenance of the beads under superatmospheric pressure during the initial stages of the heating period will also prevent premature expanding of certain of the beads which has been found to occur otherwise. The elimination of such premature bead expansion by preventing expansion until all the beads are softened and can expand together when the initially applied superatmospheric pressure is relieved, results in more uniformity of pre-expanded bead density than possible with previously known systems. Thus the application of superatmospheric pressure in the initial stages of the heating period as well as before discharge is found useful to make the more uniform density bead whether in the high density range (i.e., 8–15 pcf) or the aforementioned lower density range (i.e., 1.25 – 3 pcf).

The following example further illustrates the present invention.

EXAMPLE I

A horizontally mounted cylindrical vessel 24 inches long and 12 inches in diameter of a prototype device was provided with a motor driven axially mounted agitator. A steam carrying coil for steam heating at pressures up to 100 psig is coiled around the vessel and a motor and belt means for continuously driving the agitator is provided and suitable inlet and outlet ports having electrically operated valves are connected to an electric timing panel. A source of compressed air is connected to the vessel and valve means electrically operated in preset timed sequence is provided to pressurize the vessel at the termination of the heating cycle, the pressurized air discharging the pre-expanded beads when the outlet means are opened. The pre-expanded beads are carried by a conveying line directly to a standard molding press wherein they are charged into a heated mold and molded in the standard commercial manner to produce the finished fused cellular molded article.

A complete pre-expansion and molding cycle was run to demonstrate the advantages gained in accordance with the objectives of the present invention. The polymer beads used were FOSTAFOAM expandable polystyrene beads (3375) containing about 6% n-pentane by weight as the expanding agent. 106 grams of beads were charged to the vessel having the described steam heating coil with steam at a pressure of 25 psig resulting in a temperature within the interior of the vessel of about 215°–225° F. The beads were inside the vessel for a heating period of 1.5 minutes when exposed to a 10 second period of superatmospheric pressure (on the order of about 48 inches of mercury) and then discharged. Such beads were then immediately molded and the molded article having a thickness of 1 inch was sectioned to determine the quality of fusion of the expanded beads in the final product.

The results of the test can be summarized as follows:
1. The pre-expanded beads were of very uniform size and density of 12 pounds per cubic foot (pcf).
2. The molding cycle time saving was on the order of 50% resulting from a dramatic decrease in mold heating time (2 seconds vs. 14 seconds) as compared to molding conventionally pre-expanded high density beads and a very substantial decrease in cooling time (1.5 minutes vs. 5 minutes).
3. The fusion of the beads in the 12 pounds per cubic foot density molded article was considered excellent and the article showed no distortion from so called post expansion.

Similar results were obtained when the prototype device was used to mold articles having densities of 7.5 pcf, 4.5 pcf and 1.5 pcf, the only difference being that the heating period required in the pre-expander was greater to produce the lower density articles (i.e., 7.5 pcf required 2.0 minutes, 4.5 required 2.7 minutes and 1.5 pcf required 4.5 minutes).

Among important advantages of the invention, it is estimated that the controlled generally uniform density of the beads leaving the pre-expander results in a savings of about 5% of the polymer material required. The greater density variations of the prior art pre-expanders have caused molders to prepare the pre-expanded beads at higher than needed densities so that they have a safety factor and are insured that the pre-expanded bead density will not fall below an acceptable minimum. With the present invention providing substantially more uniform density of the pre-expanded beads, molders are able to reduce the safety factor and expand at lower target densities thus saving expensive polymer materials. Since these polymers are generally derived from petroleum any savings in this area is of course important in the present petroleum supply sensitive world climate.

The saving in mold cycle time attainable in accordance with the above description of the present invention have further petroleum and other energy source saving ramifications. Heating time period reductions possible, as explained above, as well as cooling cycle reductions requiring the pumping of cooling fluid, and the eliminating of aging the pre-expanded beads and the conveying and reheating requirement attributable thereto, all result in significant energy requirement reductions. It has been estimated that overall utility cost savings due to these economics may amount to as much as 75% over conventional moldings.

Thus it has been demonstrated that the present inventive apparatus provides many advantages resulting in both technical and economic benefit to the expandable polymer molding industry including import energy conserving reductions in molding cycle requirements which also serves the national interest.

I claim:

1. Apparatus for partially expanding expandable thermoplastic polymer particles containing a blowing agent comprising:
   a. a horizontally mounted substantially closed cylindrical vessel;
   b. means operatively connected with said vessel for inserting a measured amount of said expandable particles within said vessel;
   c. means connected to the walls of said vessel for heating the vessel walls for heating the particle within to soften the polymer particles and volatize the blowing agent causing partial expansion of said particles during their residence in said vessel;
   d. continuously driven agitating means mounted thereon and extending axially of said vessel for repeatedly wiping the particles within the vessel against the side walls thereof and then returning said particles toward the center thereof before being wiped once more against said side walls;
   e. means connected with said vessel for supplying a substantially dry pressurized gaseous medium to said vessel to increase the pressure on said particles within while in their heat softened state to superatmospheric, said pressure being adequate to substantially prevent further expansion of the particles after a predetermined amount of pre-expansion to obtain the desired uniform density thereof; and
   f. means for discharging the particles from the vessel including an exit opening in said vessel through which the gaseous medium may carry the particles from said vessel.

2. Apparatus for molding expandable thermoplastic polymer particles containing a blowing agent comprising:
   a. a horizontally mounted substantially closed cylindrical vessel;
   b. means operatively connected with said vessel for inserting a measured amount of said expandable particles within said vessel;
   c. means connected to the walls of said vessel for heating the vessel walls and for heating the particle within to soften the polymer particles and vaporize the blowing agent and causing partial expansion of said particles during their residence in said vessel;
   d. continuously driven agitating means mounted thereon and extending axially of said vessel for repeatedly wiping the particles within the vessel against the side walls thereof and then returning said particles toward the center thereof before being wiped once more against said side walls;

e. means connected with said vessel for supplying a substantially dry gaseous medium to said vessel to increase the pressure on said particles within while in their heat softened state to superatmospheric, said pressure being adequate to substantially prevent further expansion of the particles after a predetermined amount of pre-expansion to obtain the desired generally uniform density thereof;

f. means for discharging the particles from the vessel includng an exit opening in said vessel through which the gaseous medium may carry the particles from said vessel;

g. a mold, and means connected with said exit opening for conveying the heated partially expanded particles to said mold and for filling the mold therewith while maintaining the temperature of the beads above the boiling point of the blowing agent within; and h. means connected with said mold for heating the particles in the mold to affect the further expansion and fusion of the particles into the desired molded article.

* * * * *